United States Patent
Okita et al.

(10) Patent No.: US 9,850,803 B2
(45) Date of Patent: Dec. 26, 2017

(54) SADDLE-RIDDEN TYPE VEHICLE

(71) Applicant: SUZUKI MOTOR CORPORATION, Hamamatsu-shi, Shizuoka (JP)

(72) Inventors: Kazuhiro Okita, Hamamatsu (JP); Takaya Suzuki, Hamamatsu (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/298,869

(22) Filed: Oct. 20, 2016

(65) Prior Publication Data

US 2017/0114707 A1 Apr. 27, 2017

(30) Foreign Application Priority Data

Oct. 27, 2015 (JP) .................. 2015-210465

(51) Int. Cl.
| | |
|---|---|
| *F01P 11/08* | (2006.01) |
| *F01P 3/12* | (2006.01) |
| *F01P 3/18* | (2006.01) |
| *F01P 7/14* | (2006.01) |
| *F02B 61/02* | (2006.01) |
| *F01P 3/00* | (2006.01) |

(52) U.S. Cl.
CPC .............. *F01P 11/08* (2013.01); *F01P 3/12* (2013.01); *F01P 3/18* (2013.01); *F01P 7/14* (2013.01); *F02B 61/02* (2013.01); *F01P 2003/001* (2013.01); *F01P 2050/16* (2013.01); *F01P 2060/04* (2013.01)

(58) Field of Classification Search
CPC ...... F01P 11/08; F01P 3/12; F01P 3/18; F01P 3/14; F01P 7/14; F02B 61/02
See application file for complete search history.

(56) References Cited

U.S. PATENT DOCUMENTS

| | | | | |
|---|---|---|---|---|
| 2003/0106502 A1* | 6/2003 | Penn | ........................ | F01P 3/18 |
| | | | | 123/41.29 |
| 2012/0067545 A1* | 3/2012 | Yamazaki | ................ | F01M 5/00 |
| | | | | 165/52 |
| 2015/0361839 A1* | 12/2015 | Kimura | ................. | F01M 5/002 |
| | | | | 123/196 A |

FOREIGN PATENT DOCUMENTS

JP 2688828 B2 12/1997

* cited by examiner

*Primary Examiner* — Jacob Amick
(74) *Attorney, Agent, or Firm* — Stein IP, LLC

(57) ABSTRACT

There is provided a saddle-ridden type vehicle. An oil cooler cools engine oil to be supplied to an engine. A supercharger compresses combustion air to be supplied to the engine. A water pump pumps cooling water to the engine and the supercharger. A cooling piping flows the cooling water delivered from the water pump. A first inlet piping supplies the cooling water to the oil cooler. A second inlet piping is disposed in parallel with the first inlet piping and supplies the cooling water to the supercharger. A first outlet piping extends upward from the oil cooler and returns the cooling water to the water pump. A second outlet piping extends upward from the supercharger and returns the cooling water to the water pump. The first outlet piping and the second outlet piping converge above the oil cooler and the supercharger.

6 Claims, 9 Drawing Sheets

SADDLE-RIDDEN TYPE VEHICLE

CROSS-REFERENCE TO RELATED APPLICATIONS

The disclosure of Japanese Patent Application No. 2015-210465 filed on Oct. 27, 2015, including specification, drawings and claims is incorporated herein by reference in its entirety.

TECHNICAL FIELD

The disclosure relates to a saddle-ridden type vehicle including an engine having a supercharger.

BACKGROUND

A saddle-ridden type vehicle such as a motorcycle may include an engine having a supercharger so as to improve a fuel consumption and an output. The engine having the supercharger has a cooling device for cooling an oil cooler and the supercharger.

For example, the cooling device of the engine having the supercharger disclosed in Patent Document 1 has a cooling water passage (for discharge) configured to supply cooling water, which is discharged from the engine, to a radiator and a cooling water passage (for supply) configured to supply the cooling water cooled at the radiator to the engine. The oil cooler and the supercharger are connected to the cooling water passage (for discharge) via two cooling water supply passages disposed in parallel. Two cooling water discharge passages extending from the oil cooler and the supercharger converge on the way, which is connected to the cooling water passage (for supply). A water pump for pumping the cooling water to the engine is interposed on the cooling water passage (for supply).

Most of the cooling water discharged from the engine is cooled while passing through the radiator, and is again supplied to the engine through the cooling water passage (for supply). A part of the cooling water discharged from the engine passes through the two cooling water supply passages and cools the oil cooler and the supercharger. The cooling water having cooled the oil cooler and the supercharger passes through the two cooling water discharge passages and converges on the cooling water passing through the cooling water passage (for supply).

Patent Document 1: Japanese Patent No. 2688828B

In the above technology, the oil cooler and the supercharger are cooled using the cooling water having cooled the engine. However, in some cases, it is not possible to sufficiently cool the oil cooler and the supercharger by the cooling water of which temperature has increased after cooling the engine. Also, the high-temperature cooling water having cooled the supercharger and the like is mixed with the low-temperature cooling water cooled at the radiator in the cooling water passage (for supply). In this case, the temperature of the cooling water that is to be supplied to the engine becomes unstable.

SUMMARY

It is therefore an object of the disclosure to provide a saddle-ridden type vehicle capable of appropriately cooling an oil cooler and a supercharger and stabilizing a temperature of cooling water to be supplied to an engine and the like.

According to an aspect of the embodiments of the present invention, there is provided a saddle-ridden type vehicle comprising: an engine; an oil cooler configured to cool engine oil to be supplied to the engine; a supercharger configured to compress combustion air to be supplied to the engine; a water pump configured to pump cooling water to the engine and the supercharger; and a cooling piping configured to flow the cooling water delivered from the water pump, wherein the cooling piping comprises: a first inlet piping configured to supply the cooling water delivered from the water pump to the oil cooler; a second inlet piping disposed in parallel with the first inlet piping and configured to supply the cooling water delivered from the water pump to the supercharger; a first outlet piping extending upward from the oil cooler and configured to return the cooling water having cooled the oil cooler to the water pump; and a second outlet piping extending upward from the supercharger and configured to return the cooling water having cooled the supercharger to the water pump, and wherein the first outlet piping and the second outlet piping converge above the oil cooler and the supercharger.

According to the above configuration, the oil cooler (engine oil) is cooled by the cooling water supplied through the first inlet piping. The supercharger is cooled by the cooling water supplied through the second inlet piping. Since the first inlet piping and the second inlet piping are disposed in parallel, the cooling water necessary for cooling of the oil cooler and the cooling water necessary for cooling of the supercharger are separately supplied. Also, the oil cooler and the supercharger are supplied with the cooling water from the water pump, which has not been used for other cooling. Thereby, it is possible to appropriately cool the oil cooler and the supercharger.

In the saddle-ridden type vehicle, the cooling piping may further comprise a convergence piping configured to converge the first outlet piping and the second outlet piping and connected to a circulation path of the cooling water positioned above the oil cooler and the supercharger.

According to the above configuration, the first outlet piping and the second outlet piping are made to converge at the convergence piping, so that it is possible to unify circulation destinations with the circulation path.

The saddle-ridden type vehicle may further comprise: a radiator configured to cool the cooling water; a cooling water flow control unit disposed above the oil cooler and the supercharger and configured to regulate an amount of the cooling water to flow in the radiator in accordance with a temperature of the cooling water; and a core piping configured to communicate the cooling water flow control unit and the water pump each other, and the convergence piping may be configured to communicate with the core piping via the cooling water flow control unit serving as the circulation path.

When the water pump stops as the engine stops, for example, the cooling water flowing through the cooling piping also stops. Thereafter, the cooling water is heated at the supercharger, thereby generating water vapor. According to the above configuration, since the cooling water flow control unit is disposed above the supercharger and the like, the generated water vapor smoothly moves downstream through the respective outlet pipings and the convergence piping. Then, the cooling water upstream of the supercharger is supplied to the supercharger by a pressure equilibrium action between the supercharger and the cooling piping. Thereby, even after the engine stops, it is possible to continuously cool the supercharger. Also, the cooling water used for cooling of the engine, the oil cooler and the supercharger is collected to the cooling water flow control unit and is then cooled by the radiator. Thereby, it is possible to stabilize a temperature of the cooling water, which is to pass through the radiator and to be supplied to the engine.

In the saddle-ridden type vehicle, an inner diameter of the convergence piping may be made greater than an inner diameter of the first outlet piping and may be made greater than an inner diameter of the second outlet piping.

According to the above configuration, since the inner diameter of the convergence piping is made greater than the inner diameters of the respective outlet pipings, it is possible to enable the cooling water to smoothly flow from the respective outlet pipings to the convergence piping. Thereby, it is possible to improve cooling performances of the oil cooler and the supercharger.

In the saddle-ridden type vehicle, the oil cooler may be disposed at a front-lower side of the engine, the supercharger may be dispose above the oil cooler, and the cooling piping may be disposed at an inner side relative to a length of the engine in a vehicle width direction, as seen from the front, and may be disposed at a rear side of a front end portion of the supercharger, as seen from a side.

According to the above configuration, the cooling piping is intensively disposed near a front side of the engine, so that it is possible to miniaturize the engine having the supercharger.

In the saddle-ridden type vehicle, the cooling piping may further comprise a branched piping configured to branch a tip portion thereof extending from the water pump and connected to the first inlet piping and the second inlet piping, and an inner diameter of the branched piping may be made greater than an inner diameter of the first inlet piping and may be made greater than an inner diameter of the second inlet piping.

According to the above configuration, since the inner diameter of the branched piping is made greater than the inner diameters of the respective inlet pipings, it is possible to sufficiently secure flow rates of the cooling water before the cooling water is split into the respective inlet pipings. Thereby, it is possible to sufficiently supply the cooling water to the oil cooler and the supercharger.

According to the disclosure, it is possible to appropriately cool the oil cooler and the supercharger. Also, it is possible to stabilize the temperature of the cooling water that is to be supplied to the engine and the like.

DETAILED DESCRIPTION OF THE EMBODIMENTS

Hereinafter, a preferred illustrative embodiment of the disclosure will be described with reference to the accompanying drawings. Meanwhile, in below descriptions, front, rear, right, left, upper and lower directions are described on the basis of a driver who sits on a seat of a motorcycle.

Figure 1:
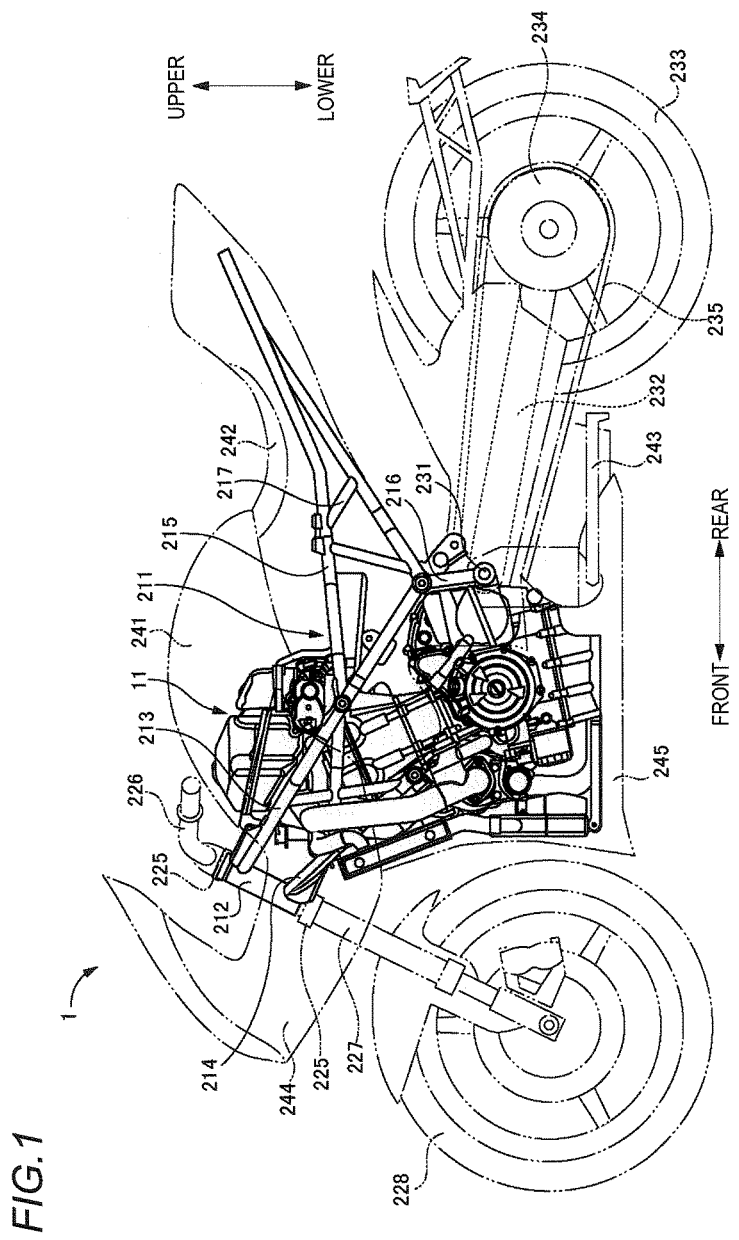
FIG. 1 is a left side view depicting a motorcycle in accordance with an illustrative embodiment of the disclosure.

An overall configuration of a motorcycle 1 in accordance with the illustrative embodiment is described with reference to FIG. 1. FIG. 1 is a left side view depicting the motorcycle 1.

A vehicle body frame 211 of the motorcycle 1 is formed by joining a plurality of steel pipes, for example. Specifically, the vehicle body frame 211 has a head pipe 212 disposed at a front-upper side of the motorcycle 1, a pair of main frames 213 each of which is disposed at right and left sides of the motorcycle 1, respectively and has a front end portion connected to an upper part of the head pipe 212 and a rear end extending rearward with being inclined downward, a pair of down tubes 214 each of which is disposed at the right and left sides of the motorcycle 1 and has a front end portion connected to a lower part of the head pipe 212 and a rear end extending rearward with being inclined downward beyond the main frame 213, a pair of side frames 215 each of which is disposed at the right and left sides of the motorcycle 1 and has a front end portion connected to an intermediate part of the down tube 214 and a rear end extending rearward, and a pair of pivot frames 216 joined to the rear ends of the main frames 213. Also, a reinforcement frame 217 is provided among the main frame 213, the down tube 214 and the side frame 215.

A steering shaft (not shown) is inserted into the head pipe 212, and upper and lower end portions of the steering shaft are respectively provided with steering brackets 225. The upper steering bracket 225 is provided with a handlebar 226. A pair of right and left front forks 227 is supported at upper parts thereof to the upper and lower steering brackets 225, and a front wheel 228 is supported to lower ends of the front forks 227.

A front end of a swing arm 232 is supported between the pair of right and left pivot frames 216 via a pivot shaft 231, and a rear wheel 233 is supported to a rear end of the swing arm 232. An axle of the rear wheel 233 is provided with a driven sprocket 234, and a chain 235 configured to transmit power of an engine 12 (which will be described later) is wound on the driven sprocket 234.

An engine unit 11 is provided between the front wheel 228 and the rear wheel 233. The engine unit 11 is mainly disposed between the left main frame 213 and left down tube 214 and the right main frame 213 and right down tube 214 and is supported to the corresponding frames.

A fuel tank 241 is provided above the engine unit 11, and a seat 242 is provided at the rear of the fuel tank 241. A side stand 243 is provided at the left side of the motorcycle 1, i.e., at a lower-rear part of the engine unit 11. An upper cowl 244 is provided at a front-upper side of the motorcycle 1. The motorcycle 1 is provided with an under cowl 245 configured to mainly cover a front-lower side of the engine unit 11.

Figure 2:
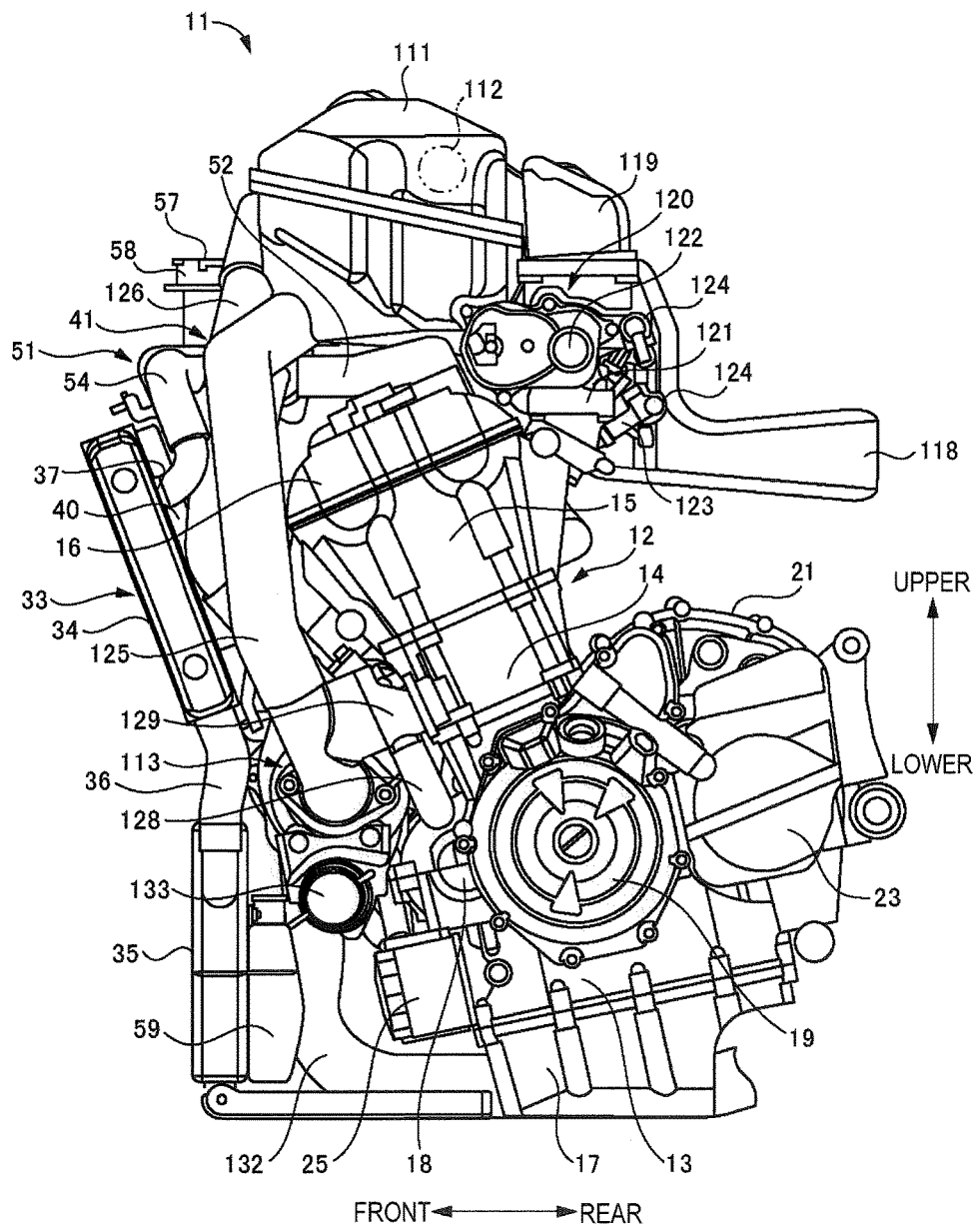
FIG. 2 is a left side view depicting an engine unit of the motorcycle in accordance with the illustrative embodiment of the disclosure.
Figure 3:
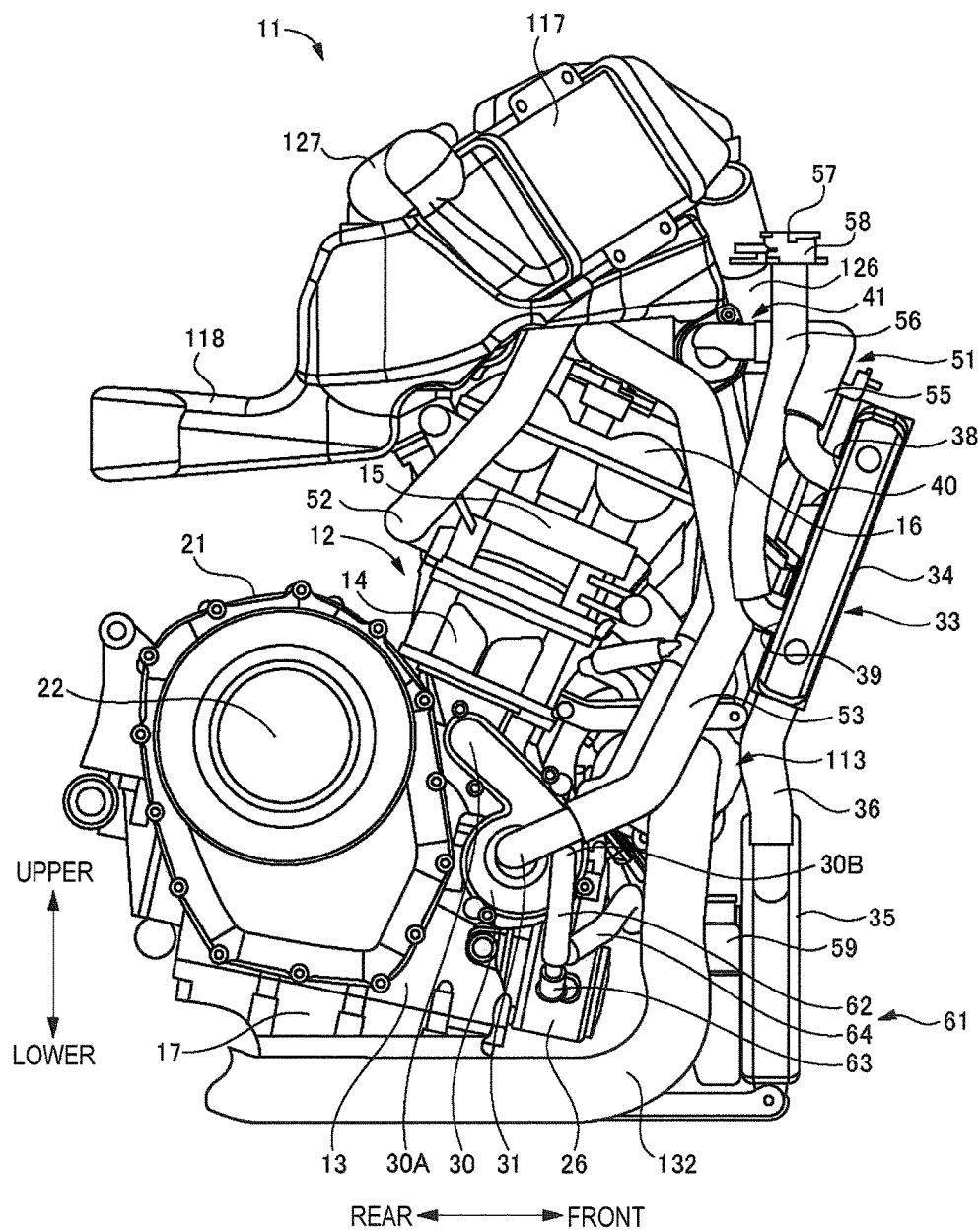
FIG. 3 is a right side view depicting the engine unit of the motorcycle in accordance with the illustrative embodiment of the disclosure.
Figure 4:
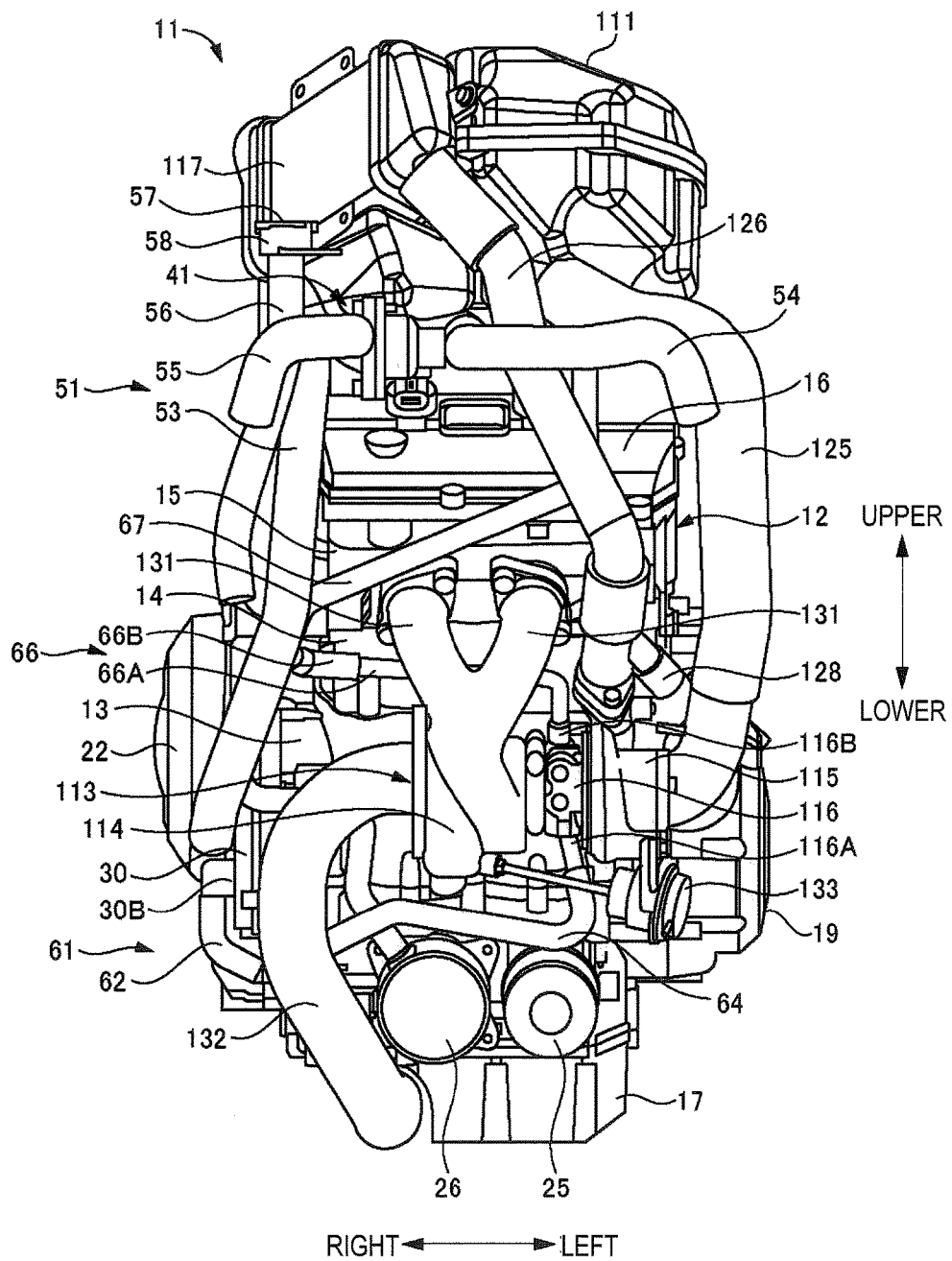
FIG. 4 is a front view depicting the engine unit (excluding a radiator) of the motorcycle in accordance with the illustrative embodiment of the disclosure.
Figure 5:
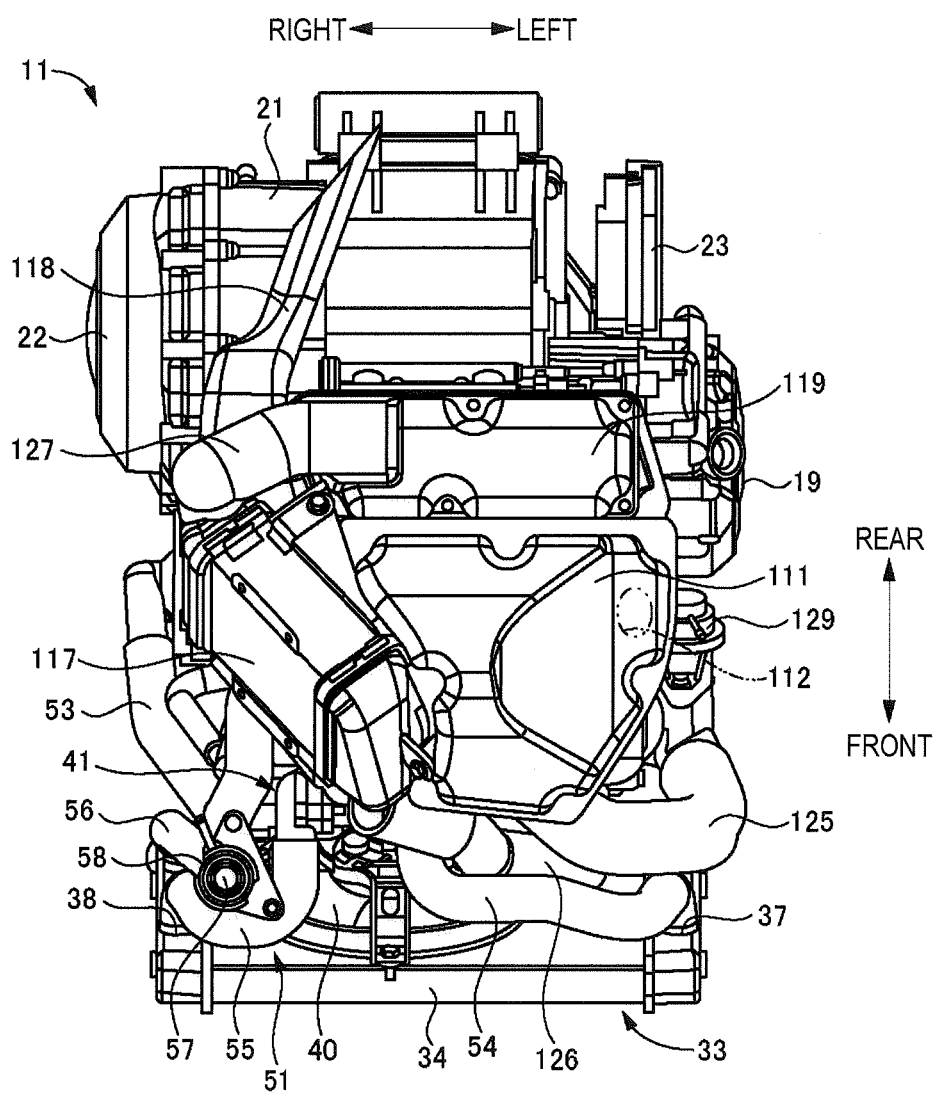
FIG. 5 is a plan view depicting the engine unit of the motorcycle in accordance with the illustrative embodiment of the disclosure.
Figure 6:
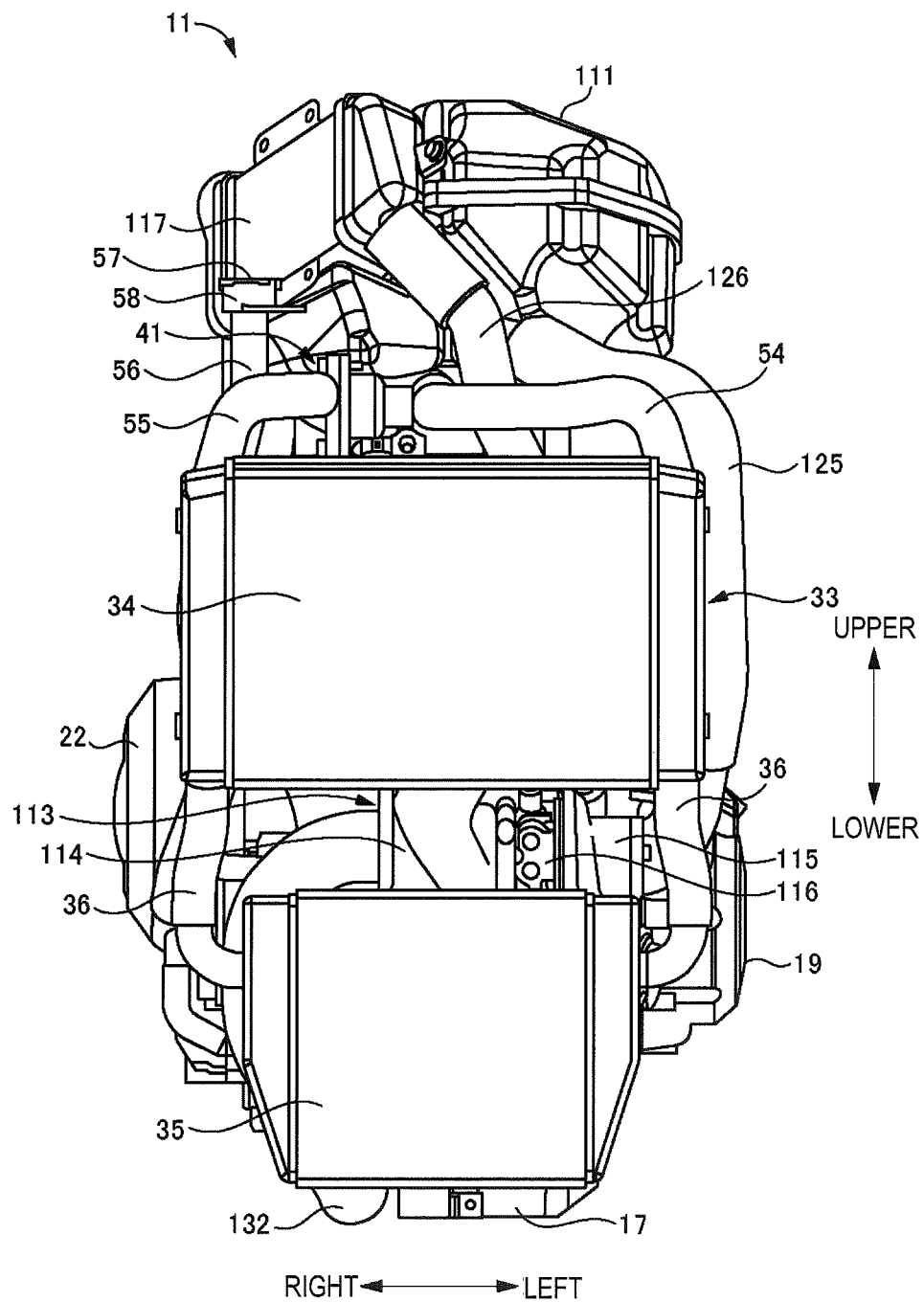
FIG. 6 is a front view depicting the engine unit (including a radiator) of the motorcycle in accordance with the illustrative embodiment of the disclosure.
Figure 7:
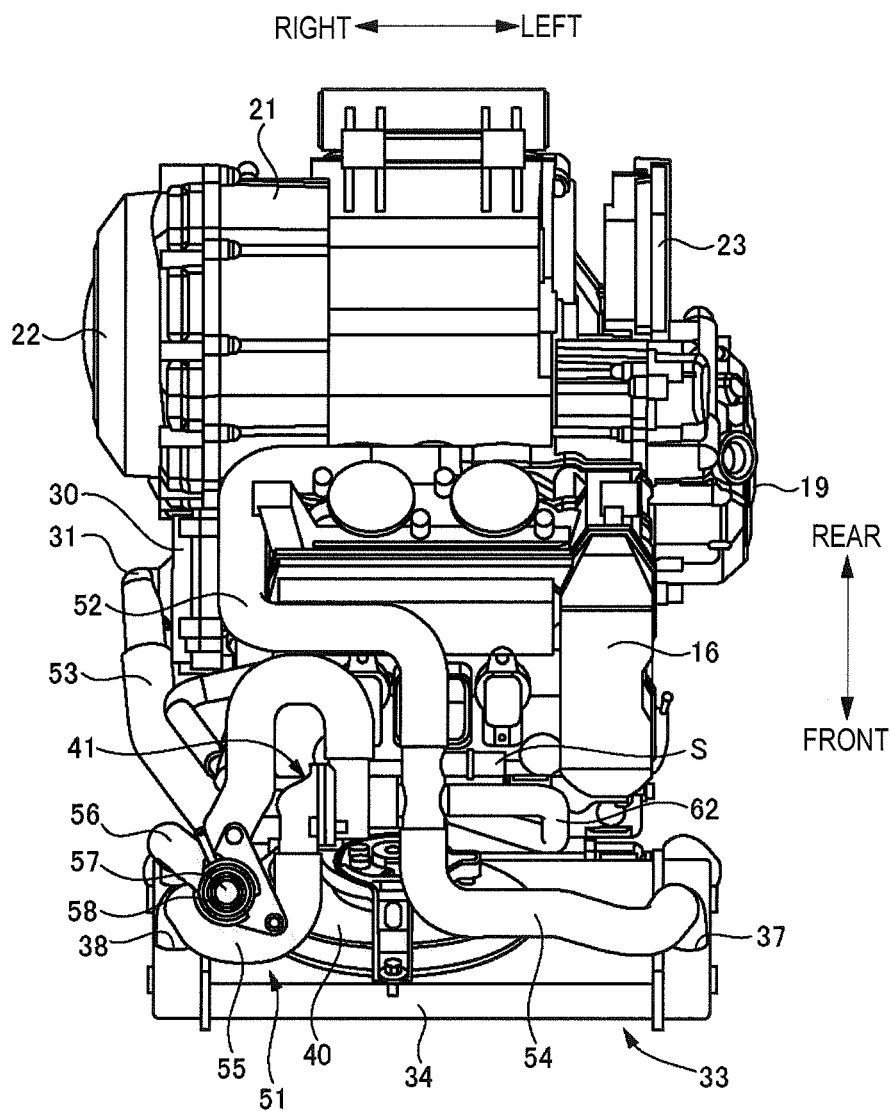
FIG. 7 is a plan view depicting an engine and a cooling system of the motorcycle in accordance with the illustrative embodiment of the disclosure.
Figure 8:
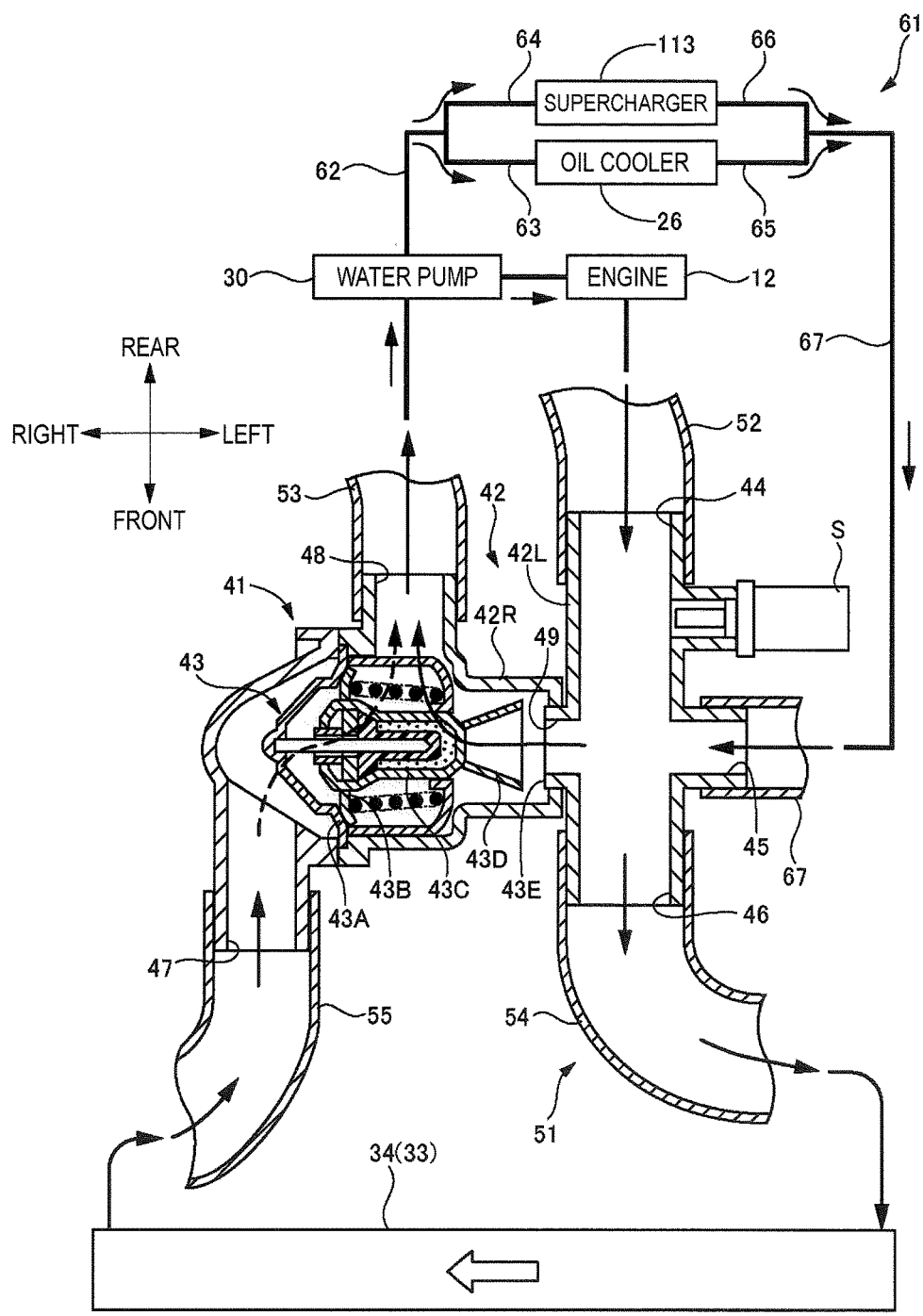
FIG. 8 is a sectional view pictorially depicting the cooling system of the engine unit of the motorcycle in accordance with the illustrative embodiment of the disclosure.
Figure 9:
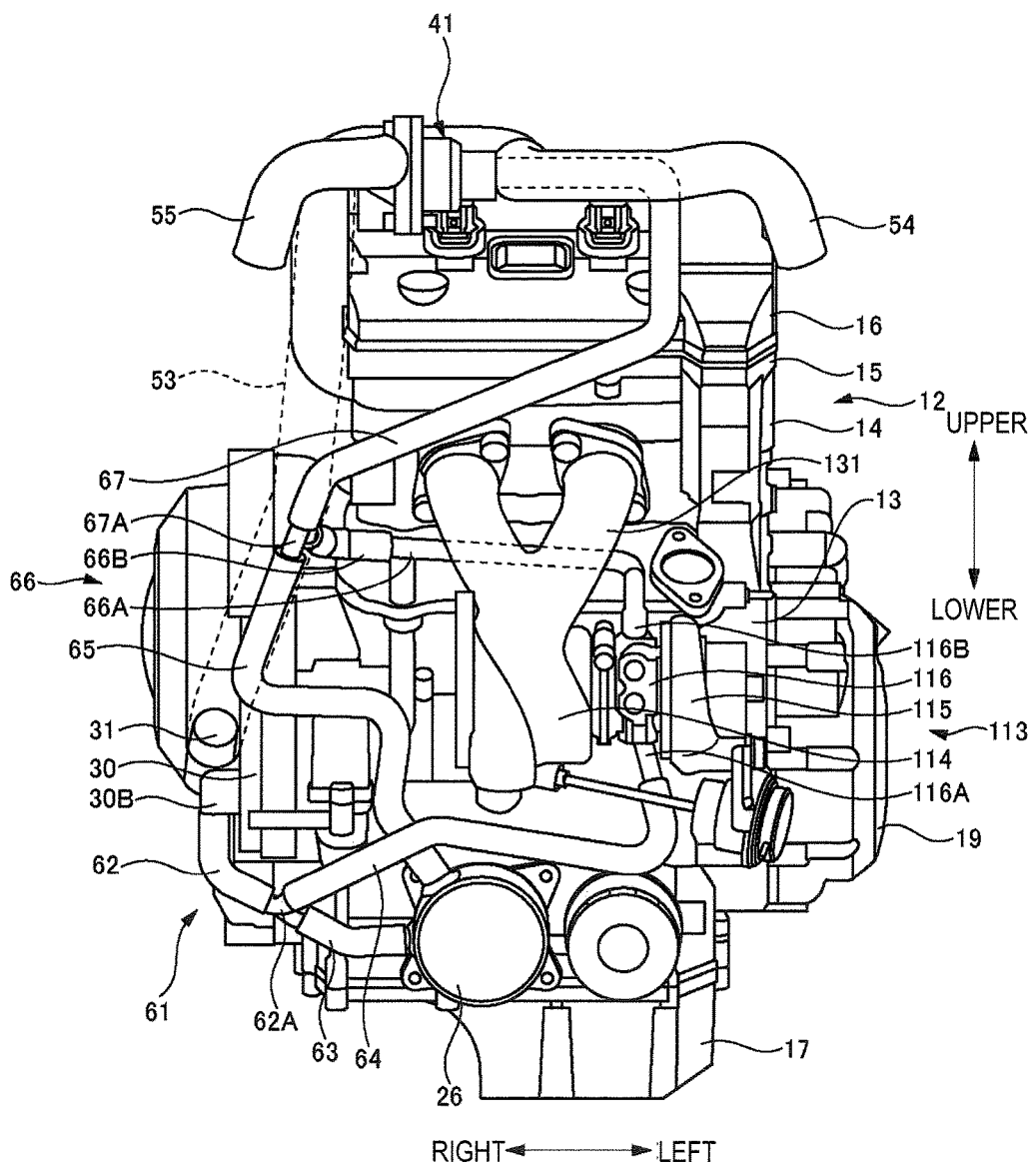
FIG. 9 is a front view depicting the engine and a cooling piping of the motorcycle in accordance with the illustrative embodiment of the disclosure.

Subsequently, the engine unit 11 is described with reference to FIGS. 2 to 9. FIG. 2 is a left side view depicting the engine unit 11. FIG. 3 is a right side view depicting the engine unit 11. FIG. 4 is a front view depicting the engine unit 11 (excluding a radiator). FIG. 5 is a plan view depicting the engine unit 11. FIG. 6 is a front view depicting the engine unit 11 (including a radiator). FIG. 7 is a plan view depicting an engine 12 and a cooling system. FIG. 8 is a sectional view pictorially depicting the cooling system of the engine unit 11. FIG. 9 is a front view depicting the engine 12 and a cooling piping 61.

The engine unit 11 has an engine 12, parts of a driving system such as a primary deceleration mechanism configured to transmit power of the engine 12 to the rear wheel 233, a clutch, a transmission and the like, a lubrication system configured to lubricate a moveable part of the engine 12, an intake system (including a supercharger 113) configured to supply a fuel-air mixture of air and fuel to the engine 12, parts of an exhaust system configured to discharge an exhaust gas, which is to be generated as the fuel-air mixture is combusted, from the engine 12, a cooling system configured to cool the engine 12 and the like, an AC generator configured to generate power by using rotation of a crankshaft, and the like.

In the illustrative embodiment, the engine 12 is a water-cooling type parallel two-cylinder four-cycle gasoline engine, for example. As shown in FIGS. 2 and 3, the engine 12 has a crank case 13 configured to accommodate therein a crankshaft (not shown), a cylinder 14 provided on the crank case 13, a cylinder head 15 provided on the cylinder 14 and a cylinder head cover 16 provided on the cylinder head 15.

An oil pan 17 is provided below the crank case 13. A cylinder axis of the engine 12 is inclined so that an upper side is located at a forward position relative to a lower side. The engine 12 is provided with a balance shaft (not shown) configured to reduce vibrations, which are to be generated by movement of a piston. The balance shaft is disposed in front of the crankshaft. Specifically, a balancer chamber 18 is integrally formed at a front part of the crank case 13 of the engine 12 (refer to FIG. 2). The balancer chamber 18 is formed by expanding forward a part of the crank case 13. The balance shaft is provided in the balancer chamber 18. A left part of the crank case 13 is provided with a magneto chamber 19 (refer to FIG. 2), and the AC generator (not shown) is accommodated in the magneto chamber 19.

A part of the driving system of the engine unit 11 is disposed at the rear of the engine 12. That is, a transmission case 21 is integrally formed at the rear of the crank case 13 and the cylinder 14, and the primary deceleration mechanism and the transmission are accommodated in the transmission case 21. A clutch cover 22 configured to cover the clutch is attached to a right part of the transmission case 21 (refer to FIG. 3). A sprocket cover 23 configured to cover a drive sprocket is provided at a left part of the transmission case 21 (refer to FIG. 2). The drive sprocket is wound with a chain 235 configured to transmit the power of the engine 12 to the rear wheel 233 (refer to FIG. 1).

As shown in FIGS. 2 to 4, the lubrication system of the engine unit 11 has an oil pump (not shown), an oil filter 25 and a water-cooling type oil cooler 26. The oil pump is configured to pump engine oil stored in the oil pan 17 of the engine 12 and to supply the same to the respective parts of the engine 12. The oil filter 25 is configured to filter the engine oil. The oil cooler 26 is configured to cool the engine oil to be supplied to the engine 12. The oil filter 25 and the oil cooler 26 are disposed side by side at the front of the lower end portion of the engine 12 and in the vicinity of a center in a right-left direction (vehicle width direction) (refer to FIG. 4).

As shown in FIGS. 2 to 5, the intake system of the engine unit 11 has an air cleaner 111, a supercharger 113, an intercooler 117, an air discharging duct 118, a surge tank 119, an electronic control throttle device 120 and an injector 123.

As shown in FIGS. 4 and 5, the air cleaner 111 is disposed at an upper-left side of the engine 12. The air cleaner 111 is a device configured to filter air introduced from an outside, and has therein an air filter (not shown). In FIGS. 2 and 5, an intake port 112 of the air cleaner 111 is pictorially shown by a dashed-two dotted line. A position of the intake port 112 can be appropriately set. Also, the intake port 112 is provided with an air duct (not shown) configured to guide the outside air into the air cleaner 111.

As shown in FIGS. 2 to 4, the supercharger 113 is disposed at the front of the cylinder 14 and the cylinder head 15 and in the vicinity of the upper of the oil cooler 26. The supercharger 113 is configured to compress combustion air to be supplied to the engine 12.

As shown in FIG. 4, the supercharger 113 has a turbine unit 114, a compressor unit 115 and a bearing unit 116.

The turbine unit 114 is disposed at a substantial center of the engine 12 in the right-left direction. The turbine unit 114 includes a turbine wheel (not shown) rotatably supported in a turbine housing. The turbine wheel is configured to rotate by the exhaust gas from the engine 12. The compressor unit 115 is disposed at the left of the turbine unit 114. The compressor unit 115 includes a compressor impeller (not shown) rotatably supported in a compressor housing. The compressor impeller is configured to rotate together with the turbine wheel and to compress the air supplied via the air cleaner 111. The bearing unit 116 is disposed between the turbine unit 114 and the compressor unit 115. The bearing unit 116 includes a bearing (not shown) configured to pivotally support the turbine wheel and the compressor impeller at an intermediate part. The bearing unit 116 is supplied with the engine oil by the driving of the oil pump. In the meantime, the compressor unit 115 may be disposed at the right of the turbine unit 114.

As shown in FIGS. 3 to 5, the intercooler 117 is disposed at an upper-right side of the engine 12. The intercooler 117 is a device configured to cool the air of which temperature has increased resulting from the compression by the compressor unit 115 of the supercharger 113. The air discharging duct 118 configured to discharge the air (discharge air) having passed through the intercooler 117 to the outside is provided in the vicinity of the intercooler 117. As shown in FIGS. 2 and 5, the surge tank 119 is disposed at an upper-rear side of the engine 12. The surge tank 119 is a device configured to rectify the flow of the air cooled by the intercooler 117.

The electronic control throttle device 120 is a device configured to regulate an amount of the air, which is to pass through the intercooler 117 and is to be supplied to the intake port of the engine 12. As shown in FIG. 2, the electronic control throttle device 120 has a throttle body 121, a throttle valve (not shown) provided in the throttle body 121 and configured to open and close an intake passage formed in the throttle body 121, and a driving motor 122 configured to drive a throttle valve. The throttle body 121 is disposed between the surge tank 119 and the intake port of the engine 12 at the rear-upper side of the engine 12.

The injector 123 is a device configured to inject the fuel to the intake port of the engine 12. To the injector 123, a delivery pipe 124 configured to supply the fuel from the fuel tank 241 to the injector 123 is connected.

The respective parts configuring the intake system are connected as follows. As shown in FIGS. 4 and 5, an air intake pipe 125 is connected between the air cleaner 111 and the compressor unit 115 of the supercharger 113. The air intake pipe 125 is disposed at a front-left side of the engine 12. Also, an air outlet pipe 126 is connected between the compressor unit 115 and the intercooler 117. The air outlet pipe 126 is disposed at the front-left side of the engine 12 and at the right of the air intake pipe 125. As shown in FIG. 5, a connecting pipe 127 is connected between the intercooler 117 and the surge tank 119. The connecting pipe 127 is disposed at the right-rear side of the upper of the engine 12.

As shown in FIGS. 4 and 5, the air introduced from the outside normally sequentially passes through the air cleaner 111, the air intake pipe 125, the compressor unit 115 of the supercharger 113, the air outlet pipe 126, the intercooler 117, the connecting pipe 127, the surge tank 119 and the throttle body 121 of the electronic control throttle device 120, and is then supplied to the intake port of the engine 12. An air bypass passage 128 (refer to FIGS. 2 and 4) configured to bypass the compressor unit 115 and to connect the air intake pipe 125 and the air outlet pipe 126 therebetween is provided in the vicinity of the supercharger 113, and an air bypass valve 129 configured to switch communication and cutoff of the air bypass passage 128 is provided on the way of the air bypass passage 128 (refer to FIGS. 2 and 5).

As shown in FIG. 4, the exhaust system of the engine unit 11 has exhaust pipes 131 configured to connect exhaust ports (not shown) of the engine 12 and the turbine unit 114 of the supercharger 113 therebetween, a muffler joint pipe 132 configured to connect the turbine unit 114 of the supercharger 113 and a muffler-side, a muffler (not shown), and the like.

The exhaust pipes 131 configure a part of the engine unit 11. The exhaust pipes 131 are disposed at the front of the engine 12. In the illustrative embodiment, the exhaust pipes 131 are integrally formed with the turbine housing of the turbine unit 114. Specifically, one ends of the two exhaust pipe 131 are respectively connected to the two exhaust ports of the parallel two-cylinder engine 12. The other ends of the exhaust pipes 131 are coupled to each other to form one, which is integrated with the turbine housing of the turbine unit 114. In the meantime, the exhaust pipe 131 may be separately provided from the turbine housing and may be coupled to the turbine housing. Meanwhile, the muffler joint pipe 132 has one end connected to the turbine housing of the turbine unit 114 and the other end passing the lower-right side of the engine 12 and extending rearward toward the muffler. Also, the muffler is disposed at a rear-lower side of the engine 12.

The exhaust gas discharged from the respective exhaust ports is supplied into the turbine unit 114 via the exhaust pipes 131. By the exhaust gas, the turbine of the turbine unit 114 is rotated. Subsequently, the exhaust gas discharged from the turbine unit 114 is supplied to the muffler via the muffler joint pipe 132 and is discharged from the muffler to the outside.

The turbine unit 114 of the supercharger 113 is provided with a waste gate valve 133. That is, the turbine unit 114 is provided therein with a gate configured to circulate a part of the exhaust gas supplied via the exhaust pipes 131 toward the muffler joint pipe 132 without supplying the same to the turbine. The waste gate valve 133 is configured to regulate an inflow amount of the exhaust gas to the turbine by opening and closing the gate.

As shown in FIG. 3, the cooling system of the engine unit 11 has a water jacket (not shown), a water pump 30, a radiator 33, a cooling water flow control unit 41, a core piping 51, and a cooling piping 61.

The water jacket is provided in the cylinder 14 and the cylinder head 15. The cylinder 14 and the cylinder head 15 are cooled by the cooling water flowing through the water jacket.

As shown in FIGS. 3 and 4, the water pump 30 is attached to the right side of the crank case 13. The water pump 30 is disposed at a position corresponding to the balance shaft positioned in front of the crankshaft. The water pump 30 is provided with a pump inlet 31. The water pump 30 is formed with a supply part 30A for supplying the cooling water to the water jacket. A front side of the water pump 30 is provided with a cooling water discharge port 30B. The water pump 30 is configured to operate by using the rotation of the crankshaft and to supply the cooling water to the engine 12 (water jacket) and the supercharger 113.

As shown in FIGS. 2, 3 and 6, the radiator 33 is disposed at the front side of the engine 12. The radiator 33 is configured to receive traveling wind or to drive a radiator fan 40, thereby radiating the heat of the cooling water to the atmosphere to cool the cooling water. The radiator 33 has an upper radiator 34 and a lower radiator 35.

The upper radiator 34 and the lower radiator 35 are disposed with being spaced vertically, and are connected to each other via a pair of right and left connecting hoses 36. As shown in FIG. 7, the radiator fan 40 is attached to a rear surface of the upper radiator 34. A radiator inlet 37 is provided at a left-upper side of the rear surface of the upper radiator 34 (refer to FIG. 2). A radiator outlet 38 is provided at a right-upper side of the rear surface of the upper radiator 34 (refer to FIG. 3).

As shown in FIG. 3, a cooling water supply port 39 to which a water injection hose 56 extending upward is connected is formed at a right-lower side of the rear surface of the upper radiator 34. An upper end portion of the water injection hose 56 is provided with a cooling water injection part 58 having a cooling water injection port 57. Also, the radiator 33 is connected with a reservoir tank 59 via an overflow pipe line (not shown).

As shown in FIGS. 6 and 7, the cooling water flow control unit 41 functioning as a circulation path is disposed above the oil cooler 26 and the supercharger 113. Specifically, the cooling water flow control unit 41 is disposed at a right-front side above the cylinder head cover 16, and is attached to a part of the engine 12 or the vehicle body frame 211. The cooling water flow control unit 41 is provided to adjust an amount of the cooling water to flow through the radiator 33 in accordance with a temperature of the cooling water. Thereby, it is possible to keep the cooling water at a predetermined appropriate temperature.

As shown in FIG. 8, the cooling water flow control unit 41 has a thermostat housing 42 and a thermostat 43. The thermostat housing 42 has a left housing 42L and a right housing 42R. The thermostat 43 is provided in the right housing 42R.

A first cooling water inlet 44 is formed at a rear side of the left housing 42L. A second cooling water inlet 45 is formed at a left side of the left housing 42L. A cooling water delivery port 46 is formed at a front side of the left housing 42L. The first cooling water inlet 44, the second cooling water inlet 45 and the cooling water delivery port 46 are configured to respectively communicate with an inside of the left housing 42L. A water temperature sensor S configured to detect the temperature of the cooling water flowing in the left housing 42L is attached to a rear-left side of the left housing 42L.

A cooling water return port 47 is formed at a front side of the right housing 42R. A cooling water outlet 48 is formed at a rear side of the right housing 42R. The cooling water return port 47 and the cooling water outlet 48 are configured to respectively communicate with an inside of the right housing 42R.

A cooling water bypass passage 49 is formed between the left housing 42L and the right housing 42R. The cooling water bypass passage 49 is configured to communicate the inside of the left housing 42L and the inside of the right housing 42R each other.

The thermostat 43 is provided to open and close the cooling water bypass passage 49 in accordance with the temperature of the cooling water. The thermostat 43 has a valve seat 43A, a main valve body 43B, a thermoelement 43C, and a sub-valve body 43D.

The valve seat 43A is fixed in the right housing 42R. The main valve body 43B and the sub-valve body 43D are fixed to the thermoelement 43C. The main valve body 43B is configured to be separated from or to be seated on the valve seat 43A. The sub-valve body 43D is configured to be separated from or to be seated on an opening edge portion (hereinafter, referred to as "sub-valve seat 43E") of the cooling water bypass passage 49. The thermoelement 43C is configured to move the main valve body 43B and the sub-valve body 43D in the right-left direction in accordance with the temperature of the cooling water. The main valve body 43B is configured to open and close a flow passage between the cooling water return port 47 and the cooling water outlet 48 and the sub-valve body 43D is configured to open and close the cooling water bypass passage 49.

As shown in FIGS. 7 and 8, the core piping 51 is configured to communicate the cooling water flow control unit 41 and the water pump 30 each other, and is provided to supply the cooling water having cooled the engine 12 to at least one of the water pump 30 and the radiator 33. That is, the water pump 30, the radiator 33, the cooling water flow control unit 41 and the core piping 51 form an engine cooling water circulation structure configure to circulate the cooling water for cooling the engine 12.

As shown in FIG. 7, the core piping 51 has a cylinder outlet hose 52, a water pump inlet hose 53, a radiator inlet hose 54 and a radiator outlet hose 55. In the meantime, each of the hoses 52 to 55 is formed of a synthetic resin having flexibility, or the like, for example.

As shown in FIG. 8, the cylinder outlet hose 52 (first core piping) is connected between an outlet (not shown) of the water jacket and the first cooling water inlet 44 of the cooling water flow control unit 41. The cylinder outlet hose 52 is provided to supply the cooling water having cooled (having flown out from the water jacket) the engine 12 to the cooling water flow control unit 41.

The water pump inlet hose 53 (second core piping) is connected between the cooling water outlet 48 of the cooling water flow control unit 41 and the pump inlet 31 of the water pump 30 (refer to FIG. 7). The water pump inlet hose 53 is provided to supply the cooling water having passed through the cooling water flow control unit 41 to the water pump 30.

The radiator inlet hose 54 (third core piping) is connected between the cooling water delivery port 46 of the cooling water flow control unit 41 and the radiator inlet 37 of the upper radiator 34 (refer to FIG. 7). The radiator inlet hose 54 is provided to supply the cooling water having passed through the cooling water flow control unit 41 to the radiator 33.

The radiator outlet hose 55 (fourth core piping) is connected between the radiator outlet 38 of the upper radiator 34 and the cooling water return port 47 of the cooling water flow control unit 41 (refer to FIG. 7). The radiator outlet hose 55 is provided to supply the cooling water having passed through the radiator 33 to the cooling water flow control unit 41.

The water pump inlet hose 53, the radiator inlet hose 54 and the radiator outlet hose 55 are intensively disposed in a space between the engine 12 and the radiator 33 (refer to FIGS. 2 and 3).

As shown in FIGS. 8 and 9, the cooling piping 61 is configured to flow the cooling water delivered from the water pump 30. The cooling piping 61 is provided to supply the cooling water having cooled the oil cooler 26 and the supercharger 113 to at least one of the water pump 30 and the radiator 33. That is, the water pump 30, the radiator 33, the cooling water flow control unit 41 and the cooling piping 61 form a supercharger cooling water circulation structure configured to circulate the cooling water for cooling the oil cooler 26 and the supercharger 113.

The cooling piping 61 is disposed at an inner side relative to a width (a length in the vehicle width direction) of the engine 12 in the right-left direction (refer to FIG. 9), as seen from the front, and is disposed at a rear side of the front end portion of the supercharger 113 (refer to FIG. 3), as seen from a side. That is, the cooling piping 61 is intensively disposed in a space between the engine 12 and the radiator 33 (refer to FIG. 3). In this way, the cooling piping 61 is intensively disposed near the front side of the engine 12, so that it is possible to miniaturize the engine having the supercharger.

The cooling piping 61 includes a branched piping 62, a first inlet piping 63, a second inlet piping 64, a first outlet piping 65, a second outlet piping 66, and a convergence piping 67. In the meantime, the branched piping 62, the first inlet piping 63, the second inlet piping 64, the first outlet piping 65 and the convergence piping 67 are preferably formed of a synthetic resin hose having flexibility, respectively, but may also be formed of a metallic pipe.

A tip portion of the branched piping 62 extending downward from the water pump 30 is branched, which are then connected to the first inlet piping 63 and the second inlet piping 64. Specifically, an upstream end portion of the branched piping 62 is connected to the cooling water discharge port 30B of the water pump 30. A downstream end portion of the branched piping 62 is attached with an upstream-side triply branched pipe 62A for splitting the flow of the cooling water into two flows.

The first inlet piping 63 is provided to supply the cooling water delivered (discharged) from the water pump 30 to the oil cooler 26. The first inlet piping 63 is connected between one branched side of the upstream-side triply branched pipe 62A and a right side surface of the oil cooler 26.

The second inlet piping 64 is provided to supply the cooling water delivered from the water pump 30 to the supercharger 113. The second inlet piping 64 is connected between the other branched side of the upstream-side triply branched pipe 62A and the bearing unit 116 of the supercharger 113. That is, the second inlet piping 64 is disposed in parallel with the first inlet piping 63. Specifically, the second inlet piping 64 extends leftward from the upstream-side triply branched pipe 62A and is disposed above the oil cooler 26 and the oil filter 25. A downstream end portion of the second inlet piping 64 is connected to a lower inlet pipe 116A protruding from a lower surface of the bearing unit 116.

An inner diameter of the branched piping 62 is made greater than an inner diameter of the first inlet piping 63 and an inner diameter of the second inlet piping 64.

The first outlet piping 65 is provided to return the cooling water having cooled the oil cooler 26 to the water pump 30. The first outlet piping 65 extends obliquely in a right-upper direction from the right upper side surface of the oil cooler 26.

The second outlet piping 66 is provided to return the cooling water having cooled the supercharger 113 to the water pump 30. The second outlet piping 66 has a supercharger outlet pipe 66A and a supercharger outlet hose 66B. In the meantime, preferably, the supercharger outlet pipe 66A is formed of metal or the like, and the supercharger outlet hose 66B is formed of a synthetic resin or the like. However, the entire second outlet piping 66 may also be formed of a metallic pipe or a synthetic resin hose.

An upstream end portion of the supercharger outlet pipe 66A is connected to an upper outlet pipe 116B protruding from an upper surface of the bearing unit 116. The supercharger outlet pipe 66A extends upward from the bearing unit 116 of the supercharger 113 and is then bent rightward. The supercharger outlet pipe 66A passes between the supercharger 113 and the exhaust pipe 131 (passes the rear of the exhaust pipe 131) and then extends rightward. The supercharger outlet hose 66B is connected between a downstream end portion of the supercharger outlet pipe 66A and a downstream-side triply branched pipe 67A (which will be described later). The first outlet piping 65 and the second outlet piping 66 are disposed in parallel with each other and converge at the right of the engine 12 and above the oil cooler 26 and the supercharger 113.

The convergence piping 67 is configured to converge the first outlet piping 65 and the second outlet piping 66 and is connected to the cooling water flow control unit 41. An upstream end portion of the convergence piping 67 is attached with the downstream-side triply branched pipe 67A for converging the first outlet piping 65 and the second outlet piping 66. The downstream-side triply branched pipe 67A is disposed above the water pump 30 and at the rear of the water pump inlet hose 53. The convergence piping 67 extends obliquely in the left-upper direction from the downstream-side triply branched pipe 67A. The convergence piping 67 passes above the exhaust pipe 131 and extends in the left direction of the engine 12. That is, the convergence piping 67 is provided to be gradient upward from the right side of the engine 12 toward the left side. A downstream end portion of the convergence piping 67 is connected to the second cooling water inlet 45 of the cooling water flow control unit 41 (refer to FIG. 8). That is, the convergence piping 67 is configured to communicate with the core piping 51 via the cooling water flow control unit 41.

The first outlet piping 65 is connected between the oil cooler 26 and one branched side of the downstream-side triply branched pipe 67A. The second outlet piping 66 is connected between the bearing unit 116 of the supercharger 113 and the other branched side of the downstream-side triply branched pipe 67A. An inner diameter of the convergence piping 67 is made greater than an inner diameter of the first outlet piping 65 and an inner diameter of the second outlet piping 66.

Herein, the flow of the cooling water is described. When the engine 12 starts, the water pump 30 also starts. The cooling water is delivered from the water pump 30 (supply part 30A) to the water jacket of the engine 12, thereby cooling the cylinder 14 and the cylinder head 15. As shown in FIG. 8, the cooling water used for cooling the engine 12 passes through the cylinder outlet hose 52 and is then introduced into the first cooling water inlet 44 of the cooling water flow control unit 41 (left housing 42L).

Also, as shown in FIGS. 8 and 9, when the water pump 30 starts, the cooling water is discharged from the cooling water discharge port 30B of the water pump 30, flows through the branched piping 62 and is then split into the first inlet piping 63 and the second inlet piping 64. The cooling water flowing through the first inlet piping 63 is supplied to the oil cooler 26 to cool the engine oil. On the other hand, the cooling water flowing through the second inlet piping 64 is supplied to the supercharger 113 to cool the turbine unit 114 and the like.

The cooling water used for cooling the oil cooler 26 (engine oil) flows through the first outlet piping 65, and the cooling water used for cooling the supercharger 113 flows through the second outlet piping 66. The cooling waters flowing through the respective outlet pipings 65, 66 converge in the downstream-side triply branched pipe 67A, which then passes through the convergence piping 67 and is then introduced into the second cooling water inlet 45 of the cooling water flow control unit 41 (left housing 42L). The cooling waters having flown out from the oil cooler 26 and the supercharger 113 converge with the cooling water having flown out from the engine 12 in the left housing 42L. The first outlet piping 65 and the second outlet piping 66 are made to converge at the convergence piping 67, so that it is possible to unify the communication destinations with the core piping 51 via the cooling water flow control unit 41.

Herein, the thermostat 43 of the cooling water flow control unit 41 is configured to control the flow of the cooling water in accordance with the temperature of the cooling water introduced into the thermostat housing 42.

As shown in FIG. 8, when the temperature of the cooling water is equal to or lower than a predetermined reference temperature T1 (for example, just after the engine 12 starts), for example, the main valve body 43B is seated on the valve seat 43A, and the sub-valve body 43D is separated from the sub-valve body 43E. That is, the thermostat 43 completely closes the flow passage between the cooling water return port 47 and the cooling water outlet 48 and completely opens the cooling water bypass passage 49. At this time, the cooling water introduced from each of the cooling water inlets 44, 45 passes through the cooling water bypass passage 49 without flowing in the radiator 33 and is then introduced into the right housing 42R from the left housing 42L. The cooling water passes through the water pump inlet hose 53 from the cooling water outlet 48 and is then introduced into the pump inlet 31 of the water pump 30. In this way, the cooling water to flow toward the radiator 33 is regulated, so that it is possible to efficiently perform a warm-up operation of the engine 12.

Also, when the temperature of the cooling water is higher than the predetermined reference temperature T1 and is equal to or lower than a predetermined reference temperature T2 (T2>T1), for example, the main valve body 43B moves in a direction of separating from the valve seat 43A and the sub-valve body 43D moves in a direction of sitting on the sub-valve seat 43E as the temperature of the cooling water increases. That is, as the temperature of the cooling water increases, the thermostat 43 increases an area of the flow passage between the cooling water return port 47 and the cooling water outlet 48 and reduces an area of the cooling water bypass passage 49. At this time, the cooling water introduced from each of the cooling water inlets 44, 45 is split into a flow facing toward the radiator 33 and a flow facing toward the cooling water bypass passage 49 in the left housing 42L. In the meantime, as the temperature of the cooling water increases, an amount of the cooling water flowing in the radiator 33 increases, as compared to an amount of the cooling water flowing in the cooling water bypass passage 49.

Specifically, the cooling water in the left housing 42L flows in the radiator inlet hose 54 from the cooling water delivery port 46 and is then introduced into the upper radiator 34 from the radiator inlet 37 (refer to FIG. 2). A part of the cooling water is cooled by the upper radiator 34, flows in the radiator outlet hose 55 from the radiator outlet 38 (refer to FIG. 3), and is then introduced into the right housing 42R from the cooling water return port 47. The remaining of the cooling water introduced into the upper radiator 34 is supplied to the lower radiator 35 through one connecting hose 36 and is cooled by the lower radiator 35. The cooling water cooled by the lower radiator 35 returns to the upper radiator 34 through the other connecting hose 36, and is introduced into the right housing 42R through the radiator outlet 38 and the like.

In the meantime, the cooling water having flowed in the cooling water bypass passage 49 converges with the cooling water having flowed in the radiator 33 inside the right housing 42R, which then returns to the water pump 30 (pump inlet 31) through the cooling water outlet 48 and the like.

Also, for example, when the temperature of the cooling water is higher than the reference temperature T2, the main valve body 43B is separated from the valve seat 43A, and the sub-valve body 43D is seated on the sub-valve seat 43E. That is, the thermostat 43 completely opens the flow passage between the cooling water return port 47 and the cooling water outlet 48 and completely closes the cooling water bypass passage 49. At this time, the cooling water introduced into the left housing 42L from each of the cooling water inlets 44, 45 flows in the radiator 33 without flowing in the cooling water bypass passage 49 and returns to the water pump 30 (pump inlet 31) from the inside of the right housing 42R.

In the meantime, the sub-valve body 43D and the sub-valve seat 43E of the thermostat 43 may be omitted. However, when the thermostat 43 having the sub-valve body 43D and the like is adopted, like the illustrative embodiment, it is possible to appropriately completely close the cooling water bypass passage 49. Thereby, it is possible to enable the cooling water in the left housing 42L to flow toward the radiator 33 without leaking the same to the cooling water bypass passage 49. Also, since the thermostat 43 having the sub-valve body 43D is greater than a thermostat having no sub-valve body 43D, the cooling water bypass passage 49 having the thermostat 43 accommodated therein is also enlarged. Thereby, since a flowing resistance of the cooling water passing through the cooling water bypass passage 49 is reduced, it is possible to rapidly perform the warm-up operation.

According to the motorcycle 1 of the illustrative embodiment as described above, the oil cooler 26 (engine oil) is cooled by the cooling water supplied through the first inlet piping 63. The supercharger 113 is cooled by the cooling water supplied through the second inlet piping 64. Since the first inlet piping 63 and the second inlet piping 64 are disposed in parallel, the cooling water necessary for cooling of the oil cooler 26 and the cooling water necessary for cooling of the supercharger 113 are separately supplied.

Also, the oil cooler 26 and the supercharger 113 are supplied with the cooling water from the water pump 30, which has not been used for other cooling. Thereby, it is possible to appropriately cool the oil cooler 26 and the supercharger 113.

Also, according to the motorcycle 1 of the illustrative embodiment, since the inner diameter of the branched piping 62 is made greater than the inner diameters of the respective inlet hoses 63, 64, it is possible to sufficiently secure the flow rates of the cooling water before the cooling water is split into the respective inlet hoses 63, 64. Thereby, it is possible to sufficiently supply the cooling water to the oil cooler 26 and the supercharger 113 (bearing unit 116).

Also, according to the motorcycle 1 of the illustrative embodiment, since the inner diameter of the convergence piping 67 is made greater than the inner diameters of the respective outlet pipings 65, 66, it is possible to enable the cooling water to smoothly flow from the respective outlet pipings 65, 66 to the convergence piping 67. Thereby, it is possible to improve cooling performances of the oil cooler 26 and the supercharger 113.

In the meantime, when the water pump 30 stops as the engine 12 stops, for example, the cooling water flowing through the cooling piping 61 also stops. Thereafter, the cooling water is heated at the oil cooler 26 or the supercharger 113, thereby generating water vapor. Regarding this, in the illustrative embodiment, the convergence piping 67 is connected to the cooling water flow control unit 41 (circulation path) positioned above the oil cooler 26 and the supercharger 114. The cooling water flow control unit 41 is disposed at the highest position of the flowing path of the cooling water. For this reason, the generated water vapor smoothly moves downstream through the respective outlet pipings 65, 66 and the convergence piping 67. Then, the cooling water upstream of the supercharger 113 is pushed toward the supercharger 113 by a pressure equilibrium action between the supercharger 113 and the cooling piping 61. Thereby, the cooling water is supplied to the oil cooler 26 and the supercharger 113, so that even after the engine 12 stops, it is possible to continuously cool the oil cooler 26 and the supercharger 113. Also, it is possible to prevent seizing of a bearing configured to pivotally support the crankshaft and deterioration of the engine oil.

Also, the cooling water used for cooling of the engine 12, the oil cooler 26 and the supercharger 113 is collected to the cooling water flow control unit 41 and is then cooled by the radiator 33. Thereby, it is possible to stabilize the temperature of the cooling water, which is to pass through the radiator 33 and to be supplied to the engine 12.

In the illustrative embodiment, the convergence piping 67 is connected to the cooling water flow control unit 41. However, the disclosure is not limited thereto. For example, the convergence piping 67 may also be connected to the water jacket of the engine 12 and other piping (a hose, a pipe, a branched piping and the like), which serve as the circulation path.

In the illustrative embodiment, the disclosure is applied to the motorcycle 1. However, the disclosure is not limited thereto. For example, the disclosure can also be applied to a saddle-ridden type vehicle (for example, a three-wheeled vehicle with two front wheels and one rear wheel) having the same structure.

In the meantime, the illustrative embodiment relates to one aspect of the saddle-ridden type vehicle of the disclosure, and the technical scope of the disclosure is not limited to the illustrative embodiment. The constitutional elements of the illustrative embodiment can be appropriately replaced or combined with the existing constitutional elements and the like. Also, the illustrative embodiment is not construed to limit the inventions defined in the claims.

What is claimed is:

1. A saddle-ridden type vehicle comprising:
an engine;
an oil cooler configured to cool engine oil to be supplied to the engine;
a supercharger configured to compress combustion air to be supplied to the engine;
a water pump configured to pump cooling water to the engine and the supercharger; and
a cooling piping configured to flow the cooling water delivered from the water pump,
wherein the cooling piping comprises:
  a first inlet piping configured to supply the cooling water delivered from the water pump to the oil cooler;
  a second inlet piping disposed in parallel with the first inlet piping and configured to supply the cooling water delivered from the water pump to the supercharger;
  a first outlet piping extending upward from the oil cooler and configured to return the cooling water having cooled the oil cooler to the water pump; and
  a second outlet piping extending upward from the supercharger and configured to return the cooling water having cooled the supercharger to the water pump, and
wherein the first outlet piping and the second outlet piping converge above the oil cooler and the supercharger.

2. The saddle-ridden type vehicle according to claim 1, wherein the cooling piping further comprises a convergence piping configured to converge the first outlet piping and the second outlet piping and connected to a circulation path of the cooling water positioned above the oil cooler and the supercharger.

3. The saddle-ridden type vehicle according to claim 2, further comprising:
a radiator configured to cool the cooling water;
a cooling water flow control unit disposed above the oil cooler and the supercharger and configured to regulate an amount of the cooling water to flow in the radiator in accordance with a temperature of the cooling water; and
a core piping configured to communicate the cooling water flow control unit and the water pump each other,
wherein the convergence piping is configured to communicate with the core piping via the cooling water flow control unit serving as the circulation path.

4. The saddle-ridden type vehicle according to claim 2, wherein an inner diameter of the convergence piping is made greater than an inner diameter of the first outlet piping and is made greater than an inner diameter of the second outlet piping.

5. The saddle-ridden type vehicle according to claim 1,
wherein the oil cooler is disposed at a front-lower side of the engine,
wherein the supercharger is disposed above the oil cooler, and
wherein the cooling piping is disposed at an inner side relative to a length of the engine in a vehicle width direction, as seen from the front, and is disposed at a rear side of a front end portion of the supercharger, as seen from a side.

6. The saddle-ridden type vehicle according to claim 1,
wherein the cooling piping further comprises a branched piping configured to branch a tip portion thereof extending from the water pump and connected to the first inlet piping and the second inlet piping, and
wherein an inner diameter of the branched piping is made greater than an inner diameter of the first inlet piping and is made greater than an inner diameter of the second inlet piping.

* * * * *

UNITED STATES PATENT AND TRADEMARK OFFICE
CERTIFICATE OF CORRECTION

PATENT NO. : 9,850,803 B2  
APPLICATION NO. : 15/298869  
DATED : December 26, 2017  
INVENTOR(S) : Kazuhiro Okita and Takaya Suzuki Page 1 of 1

It is certified that error appears in the above-identified patent and that said Letters Patent is hereby corrected as shown below:

On the Title Page

The Assignee:
Please delete "KYOCERA Document Solutions Inc., Osaka (JP)" and replace it with --SUZUKI MOTOR CORPORATION, Hamamatsu-shi, (JP)--.

Signed and Sealed this
Fourteenth Day of May, 2019

Andrei Iancu
*Director of the United States Patent and Trademark Office*